UNITED STATES PATENT OFFICE.

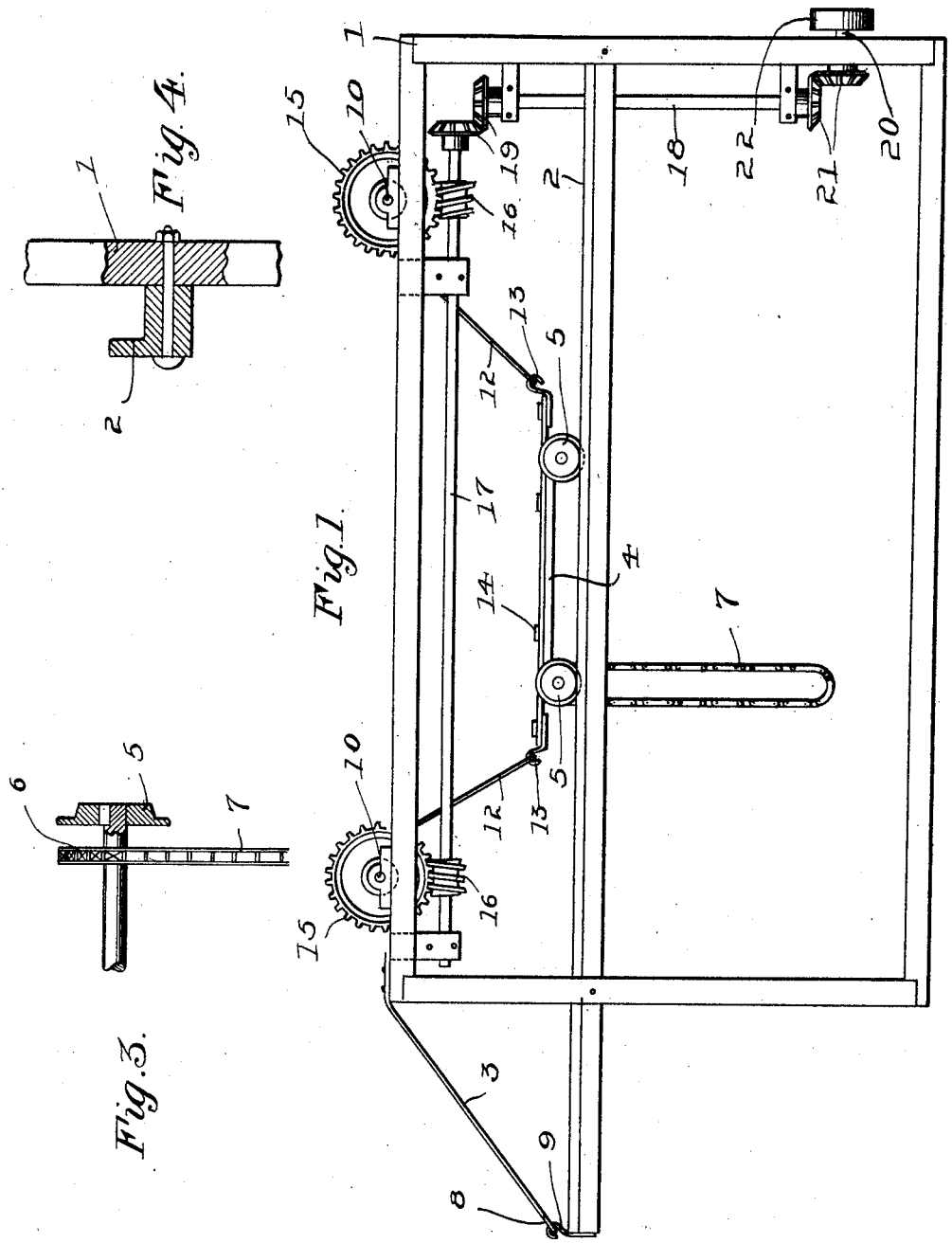

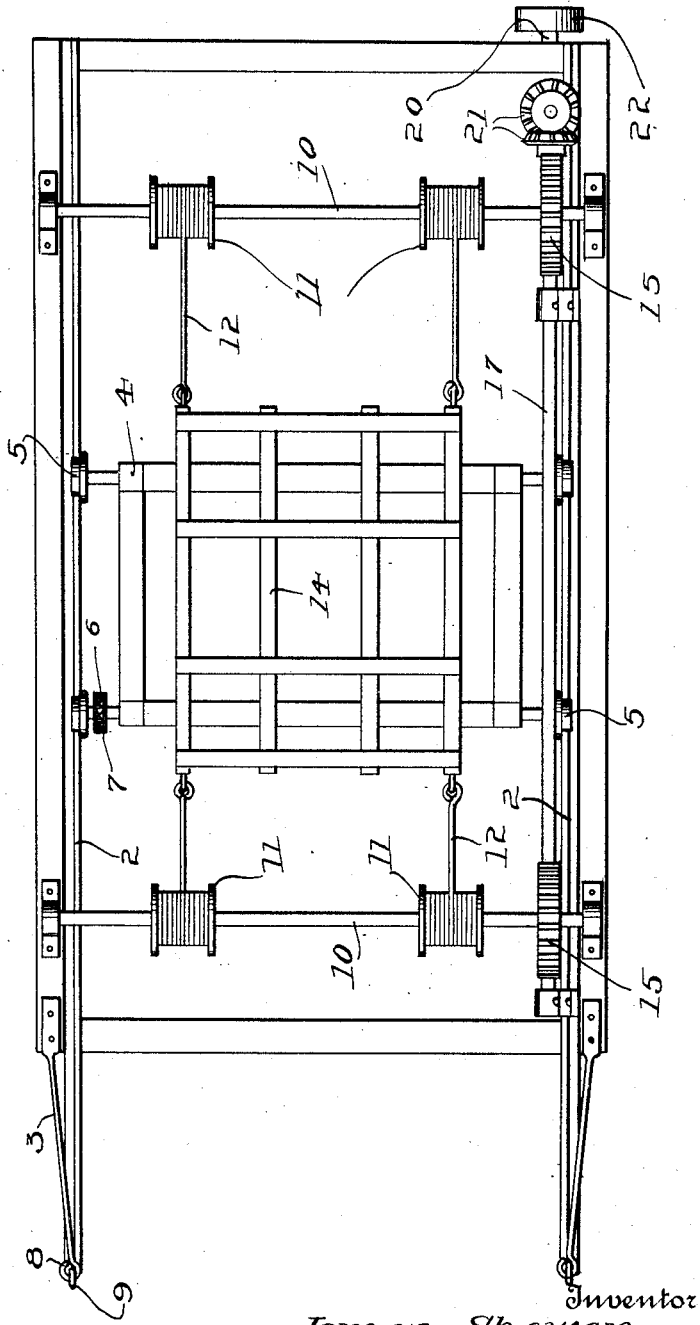

JAMES SHEWAN, OF NIAGARA FALLS, NEW YORK.

LIFTING AND CARRYING APPARATUS.

1,317,046. Specification of Letters Patent. Patented Sept. 23, 1919.

Application filed July 12, 1918. Serial No. 244,591.

*To all whom it may concern:*

Be it known that I, JAMES SHEWAN, a citizen of the United States, residing at Niagara Falls, in the county of Niagara and State of New York, have invented new and useful Improvements in Lifting and Carrying Apparatus, of which the following is a specification.

This invention relates to lifting and carrying apparatus especially adapted to be used in barns and similar buildings and it consists in the novel features hereinafter described and claimed.

An object of the invention is to provide an apparatus of the character stated which is adapted to be used for elevating and removing material as for instance hay, straw, litter and the like.

With this object in view the apparatus comprises a frame with track rails mounted thereon. The end portions of the track rails project beyond the ends of the frame and the said projecting portions may extend beyond the side of the barn or building. Braces connect the extended end portions of the track rails with the adjacent part of the frame. A truck is mounted for movement along the track rails and means are provided for moving the truck upon the rails.

Lifting means are provided upon the frame and the said means may be detachably connected with a cradle which may rest upon the truck and the material which is to be lifted and moved is loaded upon the cradle and in turn the cradle is placed upon the truck and moved to a desired point when the cradle may be removed from the truck and the material removed from the cradle.

In the accompanying drawing:

Figure 1 is a side elevation of the lifting and carrying apparatus.

Fig. 2 is a top plan view of the same

Fig. 3 is a fragmentary view through one corner of the truck showing the wheel in section and showing the operating chain for moving the truck.

Fig. 4 is a detailed sectional view showing the manner of securing the rails upon the frame.

The lifting and carrying apparatus comprises a frame 1 which may be of wood or other suitable material. This frame may be a part of the frame of a building structure or may be independent of the building. The frame is located within a building as for instance a barn. Track rails 2 are mounted upon the frame 1 and the end portions of the track rails project beyond one side of the frame. The projecting end portions of the track rails are adapted to extend or project beyond the side of the barn or building in which the apparatus is located. Braces 3 connect the extended end portions of the track rails with the adjacent end portion of the frame and serve as means for effectually supporting the projected end portions of the said rails.

A truck 4 is mounted for movement along the track rails 2 and the said truck is provided with grooved supporting wheels 5 which travel upon the rails. A sprocket wheel 6 is attached to the side of one of the wheels 5 and a chain 7 is trained around the said wheel 6 and hangs pendant therefrom. The braces 3 are provided at their ends with eyes 8 which receive the bills of hooks 9 mounted upon the track rails 2. When it is desired to remove the truck 4 from the track rails the eyes 8 may be disengaged from the hooks 9 and consequently the braces 3 may be moved or sprung away from the track rails thereby providing ample room to permit of the removal or detachment of the truck 4 from the track rails 2.

Shafts 10 are journaled upon the frame 1 and the said shafts are provided with drums 11. Cables 12 are arranged to wind upon the drums 11 and the said cables may be detachably connected with hooks 13 mounted at the end portions of a cradle 14. The cradle 14 may be composed of spaced slats suitably secured together and the cradle is adapted to rest upon the truck 14 when the cradle has been elevated.

Worm wheels 15 are mounted upon the shafts 10 and mesh with worms 16 which are mounted upon a shaft 17 journaled upon the frame 1.

A vertically disposed shaft 18 is journaled at one end portion of the frame 1 and is operatively connected with the shaft 17 by means of beveled pinions 19. A stub shaft 20 is journaled for rotation at the lower portion of the frame 1 and is operatively connected with the shaft 18 by means of beveled pinions 21. A belt pulley 22 is mounted upon the shaft 20 and a belt may be trained around the pulley 22 in a usual manner. Consequently it will be seen that when the stub shaft 20 is rotated rotary movement is transmitted by the pinions 21 to the shaft 18 and by the pinions 19 from the shaft 18 to the shaft 17. Rotation of the shaft 17 resulting in winding or unwinding of the cables 12 upon the drums 11 for raising or lowering the cradle as the case may be.

In the operation of the device, the truck 4 is moved upon the tracks to non-obstructing position with relation to the cradle, after which the pulley 22 is turned for causing rotation of the shaft 17 to effect unwinding of the cables 12 from the drums 11, so that the cradle will be lowered. The material to be transported is then placed upon the cradle and the pulley 22 is rotated in the reverse direction to cause the cables 12 to be wound upon the drums 11 which will result in elevation of the cradle. The cradle should be raised to a plane higher than the top of the truck, whereupon the truck is moved into a position below the cradle, after which the cables 12 are slackened to permit the cradles to rest upon the truck and the cables are discharged from the hooks 13. By pulling upon either side of the chain 7, the truck may then be caused to travel in the desired direction, so as to move the cradle longitudinally of the frame. It is of course understood that the frame and tracks are of considerable length and that they may extend through any desired points within a barn or other building within which the device is to be used.

From the foregoing description taken in conjunction with the accompanying drawing it will be seen that a lifting and carrying apparatus of simple and durable structure is provided and that the same may be used to advantage for storing material in barns or similar structures or removing the material therefrom.

Having described the invention what is claimed is:—

An apparatus of the character described comprising a frame, track rails mounted thereon, a truck mounted for movement upon said track rails, means for moving the truck, a pair of transverse shafts journaled upon said frame adjacent the ends thereof, drums mounted upon said shafts, a cradle adapted to be disposed upon the truck, cables arranged to wind upon said drums and detachably connected with said cradle, worm wheels carried by said shafts, a longitudinal shaft journaled upon the frame, worms carried by said longitudinal shaft meshing with said worm wheels, a bevel gear on one end of said longitudinal shaft, a vertical shaft journaled at one end of said frame, a bevel gear on the upper end of said vertical shaft meshing with said first named bevel gear, and power driven means for rotating said vertical shaft.

In testimony whereof I affix my signature.

JAMES SHEWAN.

Copies of this patent may be obtained for five cents each, by addressing the "Commissioner of Patents, Washington, D. C."